United States Patent [19]

Wilson et al.

[11] E Re. 29,103

[45] Reissued Jan. 4, 1977

[54] NITROGEN LASER ACTION WITH SUPERSONIC FLOW

[75] Inventors: Jack Wilson, Aix-en-Provence, France; Arthur R. Kantrowitz, Cambridge, Mass.

[73] Assignee: Avco Corporation, Cincinnati, Ohio

[22] Filed: Nov. 24, 1972

[21] Appl. No.: 309,126

Related U.S. Patent Documents

Reissue of:

[64] Patent No.: 3,543,179
Issued: Nov. 24, 1970
Appl. No.: 613,236
Filed: Feb. 1, 1967

[52] U.S. Cl. ..... 331/94.5 PE; 331/94.5 G
[51] Int. Cl.[2] ..... H01S 3/09
[58] Field of Search ..... 331/94.5

[56] References Cited

OTHER PUBLICATIONS

"Nitrogen Laser Action in a Supersonic Flow," by Wilson, J., *Applied Phys. Ltrs.*, vol. 8, No. 7, 4/1/66.
Patel, "CW High Power $N_2$–$CO_2$ Laser," *Applied Physics Letters*, vol. 7, No. 1, July 1, 1965, pp. 15–17.
Hurle, "Electronic Population Inversion by Fluid--Mech. Techniques," *The Physics of Fluids*, vol. 8, No. 9, Sept. 1965, pp. 1601–1606.

*Primary Examiner*—John K. Corbin
*Attorney, Agent, or Firm*—Charles M. Hogan; Irwin P. Garfinkle

[57] ABSTRACT

Lasing action is electrically induced in a supersonic flow of nitrogen gas, resulting in an increase in pulse repetition rate to a new order.

7 Claims, 1 Drawing Figure

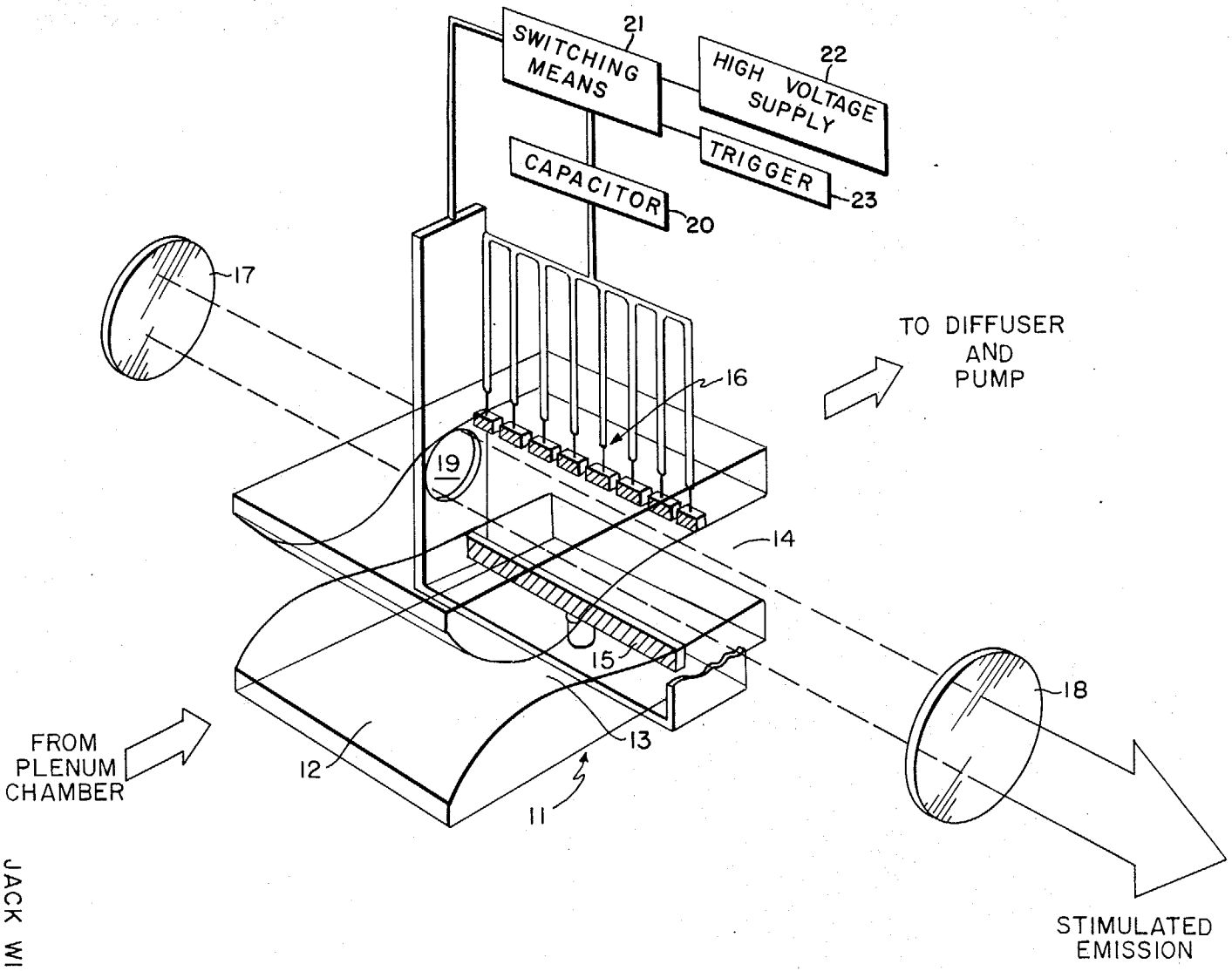
JACK WILSON
INVENTOR.
BY Charles M. Hogan
Melvin E. Frederick
ATTORNEYS.

NITROGEN LASER ACTION WITH SUPERSONIC FLOW

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to gas lasers. It is common practice in the prior art for gas lasers to employ a static or slowly flowing gas.

2. The Prior Art

Light amplification by stimulated emission of radiation (laser) has extended the range of controlled electromagnetic radiation to the infrared and visible light spectrum. A laser produces a beam of coherent electromagnetic radiation having a particular well-defined frequency in that region of the spectrum broadly described as optical. This range includes the near ultraviolet, the visible and the infrared. The coherence of the beam is particularly important because it is that property which distinguishes laser radiation from ordinary optical beams. On account of its coherence, a laser beam has remarkable properties which set it apart from ordinary light which is incoherent.

Coherence, the essential property of lasers, is of two kinds: spatial and temporal. A wave is spatially coherent over a time interval if there exists a surface over which the phase of the wave is the same (or is correlated) at all points. A wave is time-coherent at an infinitesimal area on a receiving surface if there exists a periodic relationship between its amplitude at any one instant and its amplitude at later instants of time. Perfect time coherence is an ideal since it implies perfect monochromaticity.

Laser beams have a number of remarkable properties. Because of their spatial coherence, they have an extremely small divergence and are therefore highly directional. Another important feature of lasers is the enormous power that can be generated in a very narrow wave length range. Under certain operating conditions, monochromatic bursts of millions of watts can be produced. A laser beam, because it possesses space coherence, can be focused to form a spot whose diameter is of the order of one wave length of the laser light itself. Enormous power densities are thus attainable. For example, the focused output of a 50 kilowatt infrared burst from a laser can have a radiant power density of the order of $10^{12}$ watts/cm$^2$; this is about 100 million times the power density at the surface of the sun. Extraordinarily high temperatures, orders of magnitude greater than that at the sun, can be generated at the small area which absorbs this concentrated radiation. Furthermore, since the electric field strength of an electromagnetic wave is proportional to the square root of its intensity, the field at the focus of the laser beam is millions of volts per centimeter.

Two conditions must be fulfilled in order to bring about laser action: (1) population inversion must be achieved and (2) an avalanche process of photon amplification must be established in a suitable cavity such as, for example, an optical cavity. The meaning of population inversion and the basic processes leading to it may be understood by the following discussion. Consider two energy levels $E_0$ and $E_2$ in an atom (which may exist in a gas or solid medium) where $E_0$ is the normal or ground state and $E_2$ is a higher-lying energy state. Any transition between these states involves, according to Planck's Law, the emission or absorption of a photon of value $h\nu_{02}$ where h is Planck's constant and $\nu_{02}$ is the frequency characteristic of the particular transition. At ordinary temperatures all atoms tend to be in their lowest state $E_0$ and the upper energy state $E_2$ is unoccupied. This condition will be changed, however, if a photon of energy exactly $h\nu_{02}$ impinges on the system, since this photon will be absorbed by one of the atoms which will then be raised to the excited state $E_2$. An excited state of an atom is unstable and after a short time, the atom will, without any external stimulus, make a transition to the ground state, giving off a photon of energy $h\nu_{02}$. This process is called spontaneous emission. The lifetime for spontaneous emission is an average value, and the precise value for a single excited atomic system cannot be known, because in an assembly of identical excited atoms there will be a spread of values. For different atomic systems, the value of the average lifetime of the excited state varies considerably, ranging typically from $10^{-8}$ second to $10^{-3}$ second. If a photon of energy $h\nu_{02}$ falls on an atom while it is still in the excited state, the atom is immediately stimulated to make its transition to the ground state and gives off a photon $h\nu_{02}$ which is additional to the one which triggered its emission. This process is called stimulated emission. It is significant that the radiation produced by stimulated emission is in phase with the radiation which stimulated it.

Consider now a system of very many atoms with levels $E_0$ and $E_2$. Photons $h\nu_{02}$ incident on such a system with all or most of the atoms in the ground state $E_0$ tend to be absorbed, thereby raising atoms to the excited state $E_2$; generally, the greater the number of incident photons the greater the number of atoms raised to the excited state. However, there is a limit to this process because of two factors: (1) atoms in state $E_2$ tend to revert to the ground state $E_0$ without any external stimulus (spontaneous emission); and (2) atoms in excited state $E_2$ are stimulated to revert to the ground state by their interaction with incident photons (stimulated emission). In the limit, no matter how great the incident photon flux, not more than 50% of the atoms can be forced into the excited state because the incident photons are just as likely to stimulate excited atoms to revert to the ground state as they are to cause ground state atoms to become excited. Population inversion, the condition where more atoms are in the excited state $E_2$ than in the ground state $E_0$, accordingly cannot be achieved in such a system.

Population inversion, the first previously noted necessary condition for laser action, can be accomplished if (1) the atomic system has at least three levels (one ground and at least two excited levels) which can be involved in the absorption and emission processes and (2) the spontaneous emission lifetime of one of the excited states is much longer than that of the other or others. Consider now an atom with three energy levels $E_0$, $E_1$, and $E_2$, where $E_1$ lies between the ground state $E_0$ and an upper excited state $E_2$; the atom in excited state $E_2$ relaxes to its ground state by first making a transition to $E_1$ and then a transition from $E_1$ to $E_0$ (with the emission of a photon $h\nu_{01}$); and the lifetime of excited state $E_1$ is very much longer than that of $E_2$ (by a factor of 1000, for example). If now a stream of photons of energy $h\nu_{02}$ impinges on such a system, many of the atoms will be raised to state $E_2$. In some short interval of time, these atoms will spontaneously make the transition to $E_1$. They will, on the average, remain in this state for a relatively long time (of the order, say, of milliseconds) before reverting spontaneously to the lowest energy state $E_0$. One can take advantage of the long lifetime of state $E_1$ to bring about population inversion of state $E_1$ with respect to $E_0$, that is to create a condition where the number of atoms in excited state $E_1$ exceeds that in the lower lying level $E_0$. Under the influence of a very intense flux of photons $h\nu_{02}$ a large proportion of atoms will be raised to state $E_2$. Many of these will relax to the state $E_1$, thereby creating a population in this level. Photons of energy $h\nu_{02}$ are not capable of stimulating the emission from level $E_1$; hence, on account of its long lifetime for spontaneous emission, the population in this level increases. If the incident flux $h\nu_{02}$ is made sufficiently intense over a long enough period of time, atoms initially excited from state $E_0$ to $E_2$ will accumulate in level $E_1$ to such an extent that its population will exceed that of $E_0$ and population inversion will be achieved.

If now photons of energy $h\nu_{01}$ are incident on a system where the population of level $E_1$ is inverted with respect to $E_0$, stimulated emission will exceed absorption and more photons $h\nu_{01}$ will leave the system than entered it. Such a phenomenon is called photon or quantum amplification which is the essential process in all lasers and masers; in the latter $\nu_{01}$ is a microwave frequency. In either case, $\nu_{02}$ is called the pumping frequency.

When the system is in a condition where light (photon) amplification is possible, laser action can be achieved by providing (1) means for stimulating photon emission from the long-lived state $E_1$, and (2) means for causing photon amplification to build up to extremely high values. In the usual embodiment, this is accomplished by fashioning the medium containing the active atoms into a cylinder with perfectly (as far as possible) parallel ends polished so highly that the surface roughness is measured in terms of small fractions of a wave length of light. The ends are silvered or dielectric coated to behave as mirrors which reflect photons coming toward them from the interior of the cylinder. Such a structure, whether the mirrors are within or outside the container, is called an optical cavity. If now pumping means, such as for example an intense light source, acts on the medium and brings about population inversion of $E_1$ with respect to $E_0$, even though $E_1$ is relatively long-lived, in a small fraction of a second there will be spontaneous emission of photons $h\nu_{01}$. Most of these photons will be lost to the medium, but some of them will travel perpendicular to the ends and be reflected back and forth many times by the mirrors. As these photons traverse the active medium, they stimulate emission of photons $h\nu_{01}$ from all atoms in excited state $E_1$ which they encounter. In this way, the degree of light amplification in the medium increases extraordinarily and because the photons produced by stimulated emission have the same direction and phase as those which stimulate them, the electromagnetic radiation field inside the cylinder or cavity is coherent. In order to extract a useful beam of this coherent light from the cavity, one (or both) of the mirrors is made slightly transmissive. A portion of the highly intense beam leaks through the mirror, and emerges with plane-parallel, regularly spaced wavefronts. This is the laser beam.

The establishment of in-phase back-and-forth motion of the photons in the optical cavity parallel to its axis is equivalent to the setting up of an electromagnetic standing wave of frequency $\nu_{01}$ between the two reflecting ends. A standing wave has nodes at its ends and can exist only if it is made up of an integral number of half-wave lengths. If the wave length of the beam is, for example, $10^{-4}$ centimeter (corresponding to $\nu_{01} = 3 \times 10^{14}$ cycles per seconds), this leads to exceedingly stringent geometrical requirements. Suppose, for example, that one or both mirrors have surface irregularities (that is, deviations from perfect flatness). In such case, the perpendicular distance from one mirror to the other cannot be precisely the same at all points. A standing wave can be supported in the cavity for mirror separations different from the required distance if the difference is precisely an integral number of half-wave lengths. Accordingly, if deviations of the mirrors from flatness are extensive, the distance between mirrors will not satisfy the separation distance requirement at too many points and laser action will not be achievable. Additionally, deviations from flatness of the mirror surfaces cause reflections which are not parallel to the incident direction and such reflected light rays tend to leave the cavity through the side walls thereof. Surface flatness is typically specified to be within 1/10 or 1/20 of a wave length of light, and frequently to within 1/100. By normal high quality standards, these are extremely rigid tolerances, deviations from perfect flatness being less than one-millionth of an inch. However, satisfactory flatness can be achieved in conventional manner as by lapping and polishing.

Parallelism of the mirrors is another rigorous geometrical requirement. If the mirrors are not precisely parallel, the light rays that build up in the cavity will tend to digress further and further toward the edges of the mirrors as they are reflected back and forth between the mirrors, and finally they will be directed out of the cavity altogether. It is essential that any deviations from parallelism be so small that the coherent photon streams will reflect back and forth a very large number of times to build up the required intensity for laser action. In a conventional well-made laser cylinder, the angle that one mirror makes with the other (called wedge angle) is about two seconds, or about 1/2000 of a degree. Satisfactory wedge angles may be achieved, for example, with micrometer adjustments. Use of spherical mirrors eases somewhat the rigorous requirements for keeping the still-amplifying beam in the cavity because spherical surfaces of the proper radius tend to reflect off-axis beams toward the center of the cavity. The laser radiation which emerges from a spherical mirror has spherical wave fronts and thus is divergent. However, since such coherent wave fronts appear to originate from a common center, they can be, by use of a lens, made plane-parallel and hence, except for diffraction effects, non-divergent.

A continuously operating gas laser is disclosed in an article entitled Population Inversion and Continuous Optical Laser Oscillation in a Gas Discharge Containing He-Ne Mixture, Physical Review Letters, 6, page 106, 1961. In the usual embodiment of prior art gas laser, the gas is statically contained in a tube about 100 centimeters long. The mirrors which form the ends of the optical cavity are disposed either inside the tube or external to it. Pumping is accomplished in this system by electrical excitation (either radio frequency or direct current) of helium atoms from their ground state to higher levels. Electron impact (by electrons originating from ionization of the gases) also contributes to the excitation of neon atoms to higher levels. Population inversion can thus be established under favorable conditions. Laser action can be achieved by using as mirrors multilayer dielectric coatings designed specifically to give peak reflectivity at the wave length involved. It may be noted that the lower energy states of the neon atoms involved in these laser lines are actually intermediate electronic states rather than the ground electronic state as previously discussed.

In addition to the helium-neon gas laser system, other gas laser systems, all with outputs in the infrared, have been achieved with helium, neon, argon, krypton, xenon, oxygen, and cesium (the last optically pumped in the gaseous state) as the emitting atoms.

Recently, exceptionally high gain (photon amplification per unit length) has been achieved in two gas laser systems: the 3.39 micron helium-neon emission and the 2.03 micron output from a helium-xenon mixture. High gain in a gas laser makes possible two significant advances: (1) fabrication of gas lasers with dimensions comparable to those of solid lasers; and (2) the realization, for the first time, of a useful optical amplifier. The latter is merely the excited gas mixture without the mirrors. When an external light beam passes through the active mixture of an optical amplifier, atoms in the proper excited state are stimulated to emit, thereby increasing the photon flux. In such a device, the wave length of the incident light which is to be amplified must be precisely matched to that which results from the stimulated emission process; for example, a helium-xenon amplifier is specific for the amplification of 2.03 micron radiation. Optical amplifiers are useful as part of a practical laser communications system.

From the above, it will now be evident that in prior art gas lasers, the excited atom population inversion needed for laser action was obtained from the combined effect of a favorable preferential excitation of the upper energy states by electron impact either directly or indirectly through resonance energy transfer, and a preferential de-excitation or de-population of the intermediate and lower energy states by a spontaneous emission of radiation and atomic diffusion to the containing walls of the discharge tube. Because of the fact that excitation of the upper energy state and de-excitation of the intermediate and lower energy states all occurred within approximately the same region of the discharge tube, the degree of population and inversion as well as the excited atom number density obtainable by these static methods are quite limited. Consequently, prior art apparatus and methods suffered from the disadvantage that coherent light power output thus produced is generally quite small.

In a pulsed static gas laser of the prior art, the pulse repetition rate is limited by diffusion to the walls and cooling is by heat transfer through the walls. The maximum pulse repetition rate is of the order of the reciprocal of the diffusion time, the de-excitation being by diffusion to the walls. A repetition rate of 1000 cycles per second is the practical limit for a static pulsed nitrogen laser in which the laser gas is removed by diffusion to the walls.

Prior art static gas lasers have the additional disadvantage that the power input (and hence useful power output) is limited by the heat transfer capability of the wall.

SUMMARY OF THE INVENTION

In accordance with the present [invention] *disclosure* population inversions between electronically excited states are created in a [supersonic] *high velocity, transverse flow* stream of nitrogen gas. The high speed flow and convection are exploited to improve the heat rejection of the laser, to cool the laser, and to accomplish the above mentioned enhanced repetition rate for a pulse laser.

[The] *A particular embodiment of the* invention is described in a paper entitled "Nitrogen Laser Action in a Supersonic Flow" by J. Wilson, Applied Physics Letters, Volume 8, No. 7, pages 159–161, April 1, 1966.

In contrast to the above mentioned limitations of the prior art, reference is made to the practical repetition rate of 100 kilocycles which characterizes a nitrogen laser with a rate of flow of the nitrogen gas approximating twice the speed of sound. This new order of repetition rate is an outstanding advantage of de-excitation by convection.

In accordance with the invention convection is utilized to advantage in increasing average power density. The ratio of power densities in the convection and diffusuion cases is a fraction of which the numerator is the dimension across which diffusion occurs and the denominator is the length of the mean free path of the diffusing molecules in the gas under consideration. Convection is therefore particularly advantageous in large lasers operating at high pressure.

DESCRIPTION OF THE DRAWINGS

For a better understanding of the invention, together with other and further objects, advantages and capabilities thereof, reference is made to the following description of the appended drawing, the single FIGURE of which is a schematic perspective pictorial view of a suitable apparatus in which the preferred method in accordance with the invention is practiced.

DESCRIPTION OF THE PREFERRED EMBODIMENT OF THE INVENTION

The specification now proceeds to a description of the preferred forms of laser and method in accordance with the invention.

Nitrogen is supplied to a plenum chamber, not shown. This chamber is in communication with the working section of a small supersonic wind tunnel generally designated by the reference numeral 11, which wind tunnel comprises an inlet 12, throat 13, and an outlet 14. The outlet communicates with a diffuser and pump, not shown, the pump being of the vacuum type and utilized for exhaust purposes. In the working section of the wind tunnel 11 the flow of nitrogen in the path 12-13-14 is at Mach 2. For purposes of gas discharge excitation there is mounted in the floor portion of the wind tunnel a single electrode 15, which spans the entire width of the floor section. In order to uniformly distribute the electrostatic field, an electrode collectively designated by the reference numeral 16 and comprising a multiplicity of sections connected in parallel is mounted in the roof section of the wind tunnel. An integral electrode 16 may be used if desired. In one successful embodiment of the invention, the wind tunnel was only 10 cm. wide, the electrodes being spaced apart about 2 cm. for a pressure of about 2 cm Hg. Electrode spacing in general is determined by pressure. The direction of stimulated emission is perpendicular to the direction of flow of the nitrogen and is as indicated in the drawing.

An optical cavity is defined by spaced mirror elements 17 and 18, the planes of which are normal to this direction. One of these mirror elements is completely reflecting and the other is partially reflecting and partially transmissive. It will be understood that gas laser amplifying elements constitute a complete oscillator when coupled to a feedback circuit. The optical feedback circuit here involved comprises the mirrors 17 and 18 which are arranged to form a closed optical path or optical cavity of low loss, into which the amplifier elements are effectively inserted. The mirrors 17 and 18 here shown comprises one of many possible resonator structures.

The sides of the wind tunnel are partially defined by fully transmissive quartz windows such as that designated 19, which are in registry with the path defined by the mirrors 17 and 18.

Laser action is induced by the discharge of a capacitor which is in series with the cathode-anode circuit of a thyratron which is utilized as an electrical switch. A plurality of capacitors, designated as 20, each with its own thyratron switch, comprising switching means 21, may be connected in parallel across the laser and fired in sequence, in order to increase the repetition rate. The switching means 21 is coupled to a conventional high voltage supply 22 and is actuated by conventional trigger means 23. In the specific embodiment under consideration the thyratron was a type 5-C22 and the nitrogen flowed at a static pressure of 2 cm. Hg and laser action was observed, with a pulse width of 20 nanoseconds.

Due to the long de-ionization time of thyratrons, it is not possible to provide high repetition rates by a single thyratron, the maximum repetition rate of a single thyratron being about 2KC. Accordingly, a plurality of capacitors, such as, for example, four or more, each with its own thyratron switch may be connected in parallel across the laser and fired in sequence with a suitable delay of, for example, 75-$\mu$sec. to achieve a pulse rate of, for example, 13KC as achieved in the aforementioned successful embodiment. The delay between firing the thyratrons is chosen so that the gas moves a distance downstream greater than the electrode separation so that there will be very little, if any, tendency for breakdown to take place through the ionized slug of gas left by the previous pulse.

If each capacitor stores 0.5 joules which is dumped by its thyratron switch in about $140 \times 10^{-9}$ seconds, this will provide about 3 megawatts. During the laser pulse, laser power will be about 1KW for a 20 nanosecond pulse. The energy in the laser pulse is .02 millijoules. At 13 KC, this is an average power of about ¼ watt.

Considerable latitude in selection of a Mach number and nozzle design exists so long as a supersonic flow is provided as and for the purposes set forth hereinabove. Further, inasmuch as the gas temperature in outlet 14 is only of the order of 160° K, it is not necessary to employ high temperature materials such as refractory materials and the like. Still further, while the invention has been described in connection with the use of nitrogen, it is not so limited. Other gases, while possibly less satisfactory to a greater or lesser degree may be used, such as, for example, carbon dioxide, helium/neon, argon, and carbon monoxide.

Electrical pumping by means of a gaseous discharge, providing an efficient source of light, is the principle herein employed and it may be implemented by many means, so that the invention is not limited to the specific pumping means herein shown.

An attempt to operate the laser with static gas in the wind tunnel at that pressure produced no laser action because of insufficient gain in the static gas. Now the expansion of nitrogen to Mach 2 from room temperature causes a large drop in temperature which increases the gain coefficient. This increase is due to various factors including a reduction of line width and an increase in population at the most populated rotational level.

While there has been shown what is at present considered to be the preferred embodiment of the invention, it will be understood by those skilled in the art that various changes and modifications may be made in the preferred apparatus and method without departing from the proper scope of the invention as claimed in the appended claims.

Having disclosed my invention, I claim:

1. The method of light generation by stimulated emission of radiation in an optical cavity which comprises the steps of:

first, passing a supersonic flow of the working medium in a direction orthogonal to the axis of the cavity, and second, electrically pumping the medium to induce lasing action.

2. The method of light generation in accordance with claim 1 in which the working medium is nitrogen.

3. The method of light generation in accordance with claim 1 in which the electrical pumping is by electrostatic energy discharge.

4. The method in accordance with claim 3 in which the electrostatic discharge is at a high repetition rate.

5. A high powered laser comprising means including a constricted throat wind tunnel for producing a supersonic flow of a gas working medium, means defining an optical cavity through which the flow passes, and means for electrically pumping the medium to induce lasing action.

6. Apparatus in accordance with claim 5 in which the working medium is nitrogen gas.

7. Apparatus in accordance with claim 5 in which the electrical pumping means comprises an energy storage device and means for repetitively charging and discharging it at a high rate.

[ 8. The method of light generation by stimulated emission of radiation in an optical cavity which comprises the steps of:

(a) passing a high velocity flow of a gaseous working medium at high pressure in a direction orthogonal to the axis of the cavity; and (b) producing an electrical discharge through said medium to induce lasing action in said cavity, said discharge extending substantially along the length of the lasing region in said cavity.]

[ 9. The method as defined in claim 8 wherein said electrical discharge is produced in the form of pulses at a rate that between each pulse the medium moves a distance downstream greater than the electrode separation distance in said cavity.]

[10. The method as defined in claim 8 wherein said velocity is at least sufficient to provide cooling by convection and said pressure is maintained in excess of two centimeters of mercury.]

[11. A high powered laser comprising:

(a) gas supply means including a constricted throat wind tunnel for producing a high velocity flow of a gaseous working medium;

(b) means defining an optical cavity for receiving said medium from said wind tunnel in a direction orthogonal to the axis of said cavity and through which said flow passes; and (c) means for producing an electrical discharge through said medium and extending substantially along the length of the lasing region in said cavity to induce lasing action in said cavity.]

[12. The combination as defined in claim 11 wherein said means for producing said electrical discharge includes further means for producing said discharge in the form of pulses at a rate that between each pulse the medium moves a distance downstream greater than the electrode separation distance in said cavity.]

[13. The combination as defined in claim 11 wherein said gas supply means included additional means for providing a pressure in said cavity in excess of two centimeters of mercury and convection cooling in said cavity.]

* * * * *